F. M. ASHLEY.
MECHANIC'S TOOL.
APPLICATION FILED FEB. 4, 1920.
1,362,981. Patented Dec. 21, 1920.
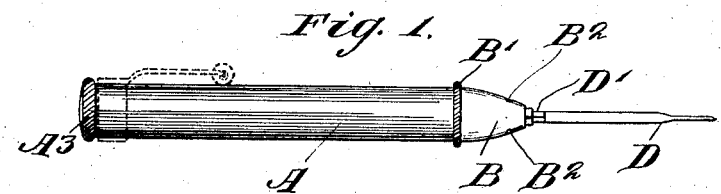
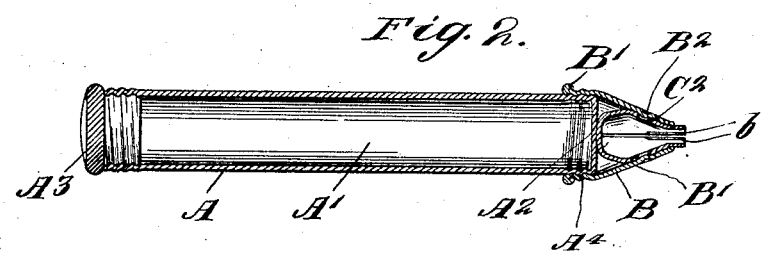
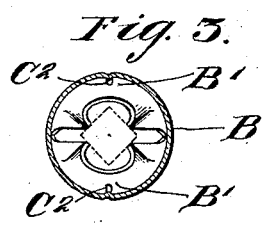
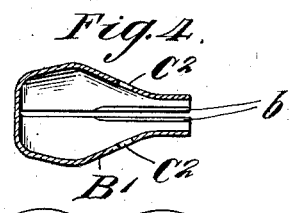
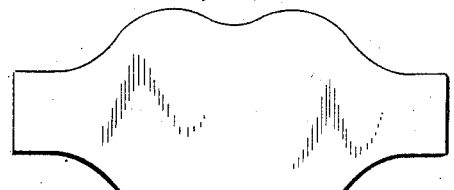
INVENTOR
Frank M Ashley

UNITED STATES PATENT OFFICE.

FRANK M. ASHLEY, OF BROOKLYN, NEW YORK.

MECHANIC'S TOOL.

1,362,981.   Specification of Letters Patent.   Patented Dec. 21, 1920.

Substitute for application Serial No. 109,905, filed July 18, 1916. This application filed February 4, 1920. Serial No. 357,098.

*To all whom it may concern:*

Be it known that I, FRANK M. ASHLEY, a citizen of the United States, and resident of Brooklyn, in the county of Kings and State of New York, have invented certain new and useful Improvements in Mechanics' Tools, of which the following is a specification.

My invention relates to mechanics' tools and the object of same is to provide a tool holder and chuck for use by jewelers.

Referring to the drawings which form part of this specification,

Figure 1. is a view of a full sized tool holder with a screw driver held by the chuck.

Fig. 2. is an enlarged longitudinal view of same shown in section.

Fig. 3. is an end view of the chuck, the cap portion being shown in section to disclose the form of the chuck.

Fig. 4. is a longitudinal sectional view of the jaws of the chuck.

Fig. 5. is a view of the blank from which the chuck is formed.

One object is to provide a tool holder made entirely from sheet metal and stamped or formed in a cheap and practical manner.

A further object is to provide a chuck that will grip the shank of a tool for a considerable linear distance and hold firmly either a square or round shank.

A further object is to provide a shank which is held by the fingers when used in the act of driving a screw so that the cap will not loosen or tighten on the jaws of the chuck in turning the same.

A, indicates the body portion which is rolled or drawn in tube form to provide a receptacle A′ having a closure $A^3$ and an end wall $A^2$, which acts to stiffen the end of the holder and also as an abutment for the rear end of the jaw elements.

B, is the cap which is provided with a thread to engage the thread $A^4$ formed on the end of the body portion. The cap is provided with a raised rim portion B′ which is knurled so that it may be firmly grasped in driving a screw driver or other tool.

C, illustrates the jaws which are preferably formed by first making a blank as shown in Fig. 5 and then bending it to form two jaws, the edges of the blank being turned in to form parallel portions as shown at $b$—$b$ and the outer surface formed conically as shown at B′. The rear end is formed integral with the jaws and acts as a spring to automatically open the jaws when the cap is unscrewed.

The cap is provided with indents $B^2$—$B^2$ respectively which engage slots $C^2$—$C^2$ respectively in the jaw elements to insure the jaws turning with the cap.

D, indicates a screw driver having a square shank D′, illustrated in dotted lines in Fig. 3.

The receptacle is intended to hold a number of small tools such as used by jewelers and is intended to fill a need for such a device, small enough to be carried in the pocket like a fountain pen, with a clip to prevent its loss. The jaw elements are preferably made of steel but the holder may be made of silver or other suitable metal that will be neat and ornamental without sacrificing the utility of the tool.

It will thus be clear that I have provided a novel and very simple combination tool holder and tool in which the chuck member consists of only two separate parts easily coöperating with each other, and removably held together on the body portion which is rolled from one piece of sheet metal, so as to leave a hollow space within which the tools may be held. This simple construction provides a neat and compact tool holder, which is portable, easily manipulated and cheap to manufacture.

Having thus described my invention I claim as new,

A tool holder comprising a hollow cylindrical sheet metal handle portion having a closed end, a hollow pear shaped clamping member struck from a single sheet of metal concaved and folded to afford a substantial base and a conical portion providing two jaws, and a cap piece engaging the periphery of the conical portion and detachably engaging the closed end of the handle portion to secure the clamping member thereto and to contract the jaws.

Signed at New York city, in the county of New York and State of New York this 6th day of September A. D. 1919.

FRANK M. ASHLEY.